(12) United States Patent
Belmont et al.

(10) Patent No.: US 12,237,498 B2
(45) Date of Patent: Feb. 25, 2025

(54) APPARATUS AND METHODS FOR FABRICATION OF CARBON FOAMS AND SILICON-CARBON COMPOSITE ANODES

(71) Applicant: UNIVERSITY OF WYOMING, Laramie, WY (US)

(72) Inventors: Erica Belmont, Laramie, WY (US); Kurt Stahlfeld, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 940 days.

(21) Appl. No.: 16/935,671

(22) Filed: Jul. 22, 2020

(65) Prior Publication Data

US 2021/0028443 A1  Jan. 28, 2021

Related U.S. Application Data

(60) Provisional application No. 62/979,726, filed on Feb. 21, 2020, provisional application No. 62/876,890, filed on Jul. 22, 2019.

(51) Int. Cl.

| | |
|---|---|
| *C01B 32/05* | (2017.01) |
| *C10G 1/00* | (2006.01) |
| *H01M 4/36* | (2006.01) |
| *H01M 4/38* | (2006.01) |
| *H01M 4/587* | (2010.01) |
| *H01M 10/0525* | (2010.01) |
| *H01M 4/02* | (2006.01) |

(52) U.S. Cl.
CPC ............. *H01M 4/364* (2013.01); *C01B 32/05* (2017.08); *C10G 1/002* (2013.01); *H01M 4/386* (2013.01); *H01M 4/587* (2013.01); *H01M 10/0525* (2013.01); *C01P 2004/03* (2013.01); *C01P 2006/40* (2013.01); *C10G 2300/1011* (2013.01); *H01M 2004/021* (2013.01); *H01M 2004/027* (2013.01)

(58) Field of Classification Search
CPC .................................................. C01B 32/05
See application file for complete search history.

(56) References Cited

U.S. PATENT DOCUMENTS

| | | |
|---|---|---|
| 3,121,050 A | 2/1964 | Ford |
| 5,888,469 A | 3/1999 | Stiller et al. |
| 6,033,506 A | 3/2000 | Klett |
| 8,188,716 B2 | 5/2012 | Kolosnitsyn et al. |
| 8,361,652 B2 | 1/2013 | Kolosnitsyn et al. |
| 8,647,769 B2 | 2/2014 | Kolosnitsyn et al. |
| 8,679,684 B2 | 3/2014 | Kolosnitsyn et al. |
| 9,123,975 B2 | 9/2015 | Kolosnitsyn et al. |
| 9,196,929 B2 | 11/2015 | Kolosnitsyn et al. |
| 9,219,271 B2 | 12/2015 | Kolosnitsyn et al. |
| 10,020,533 B2 | 7/2018 | Lindstrom et al. |
| 10,461,316 B2 | 10/2019 | Kolosnitsyn et al. |
| 2017/0313945 A1* | 11/2017 | Rima .............. B01J 23/06 |

OTHER PUBLICATIONS

"Andersen, et al., Silicon-Carbon composite anodes from industrial battery grade silicon, Scientific Reports vol. 9, Article No. 14814 (2019), 9 pages".
"Wu, et al., The critical role of carbon in marrying silicon and graphite anodes for high?energy lithium?ion batteries, Carbon Energy Wiley, vol. 1, Issue 1, Sep. 2019, 20 pages".
"Li, et al., Graphene enhanced silicon/carbon composite as anode for high performance lithium-ion batteries, Royal Society of Chemistry, RSC Adv., 2017, 7, pp. 48286-48293".
"Liu, et al., Solutions for the problems of silicon-carbon anode materials for lithium-ion batteries, R. Soc. of Open Science 5: 2018, 22 pages".
Basile, et al., Influence of pressure on the heat of biomass pyrolysis, Fuel 137 (2014) pp. 277-284.
"Biagini, et al., Size and structural characterization of lignin-cellulosic fuels after the rapid devolatilization, Fuel 87 (2008) pp. 177-186".
"Biagini, et al., Characterization of high heating rate chars of biomass fuels, Proceedings of the Combustion Institute 32 (2009) pp. 2043-2050".
"Cetin, et al., Influence of pyrolysis conditions on the structure and gasification reactivity of biomass chars, Fuel 83 (2004) pp. 2139-2150".
"Chen, et al., Investigation of heat of biomass pyrolysis and secondary reactions by simultaneous thermogravimetry and differential scanning calorimetry, Fuel 134 (2014) pp. 467-476".
"Dall'Ora, et al., Suspension Combustion of Wood: Influence of Pyrolysis Conditions on Char Yield, Morphology, and Reactivity, Energy & Fuels 2008, 22, pp. 2955-2962".
"Dauenhauer, et al., Reactive boiling of cellulose for integrated catalysis through an intermediate liquid, Green Chem., 2009, 11, pp. 1555-1561".
Demirbas, et al., An Overview of Biomass Pyrolysis, Energy Sources, 24: pp. 471-482, 2002.
"Di Blasi, Modeling chemical and physical processes of wood and biomass pyrolysis, Progress in Energy and Combustion Science 34 (2008) pp. 47-90".
Dimesso, et al., Investigation of graphitic carbon foams/LiNiPO4 composites, J Solid State Electrochem (2012) 16: pp. 3791-3798.
"Fisher, et al., Pyrolysis behavior and kinetics of biomass derived materials, Journal of Analytical and Applied Pyrolysis 62 (2002) pp. 331-349".
Gallego, et al., Carbon foams for thermal management, Carbon 41 (2003) pp. 1461-1466.
Gomez, et al., Influence of Secondary Reactions on the Heat of Pyrolysis of Biomass, Ind. Eng. Chem. Res. 2009, 48, pp. 10222-10233.

(Continued)

*Primary Examiner* — Stuart L Hendrickson
(74) *Attorney, Agent, or Firm* — Patterson + Sheridan, LLP (57) ABSTRACT

The disclosure generally relates to a method for fabrication of carbon foam and materials derived from the pyrolization of biomass at supercritical and subcritical conditions for $CO_2$ and $N_2$. The method includes exposing biomass to $CO_2$ and $N_2$ under various parameters for temperature, pressure, heating rate and fluid flow rate. Silicon-carbon composite anodes and anode fabrication methods are also described.

15 Claims, 4 Drawing Sheets

(56) References Cited

OTHER PUBLICATIONS

"Haas, et al., Real-Time and Post-reaction Microscopic Structural Analysis of Biomass Undergoing Pyrolysis, Energy & Fuels 2009, 23, pp. 3810-3817".
"Haseli, et al., Modeling biomass particle pyrolysis with temperature-dependent heat of reactions, Journal of Analytical and Applied Pyrolysis 90 (2011) pp. 140-154".
"He, et al., Investigation on caloric requirement of biomass pyrolysis using TG-DSC analyzer, Energy Conversion and Management 47 (2006) pp. 2461-2469".
Inagaki, et al., Carbon foam: Preparation and application, Carbon 87, 2015, pp. 128-152.
"Jarvis, et al., Elucidation of Biomass Pyrolysis Products Using a Laminar Entrained Flow Reactor and Char Particle Imaging, Energy Fuels 2011, 25, pp. 324-336".
"Klett, et al., High-thermal-conductivity, mesophase-pitch-derived carbon foams: effect of precursor on structure and properties, Carbon 38 (2000) pp. 953-973".
Lede, et al., Radiant Flash Pryolysis of Cellulose Pellets: products and mechanisms involved in Transient and Steady State Conditions, Fuel 81, 2002, pp. 1269-1279.
Lepage, et al., Characterization of a microbial fuel cell with reticulated carbon foam electrodes, Bioresource Technology 124 (2012) 199-207.
Li, et al., Expanded graphite applied in the catalytic process as a catalyst support, Catalysis Today 125 (2007) 278-281.
"Mahinpey, et al. Analysis of Bio-Oil, Biogas, and Biochar from Pressurized Pyrolysis of Wheat Straw Using a Tubular Reactor, Energy & Fuels 2009, 23, 2736-2742".
"Maldonado-Hodar, et al., Catalytic Graphitization of Carbon Aerogels by Transition Metals, Langmuir 2000, 16, 4367-4373".
"Maliutina, et al., Pressurized entrained-flow pyrolysis of microalgae: Enhanced production of hydrogen and nitrogen-containing compounds, Bioresource Technology vol. 256, May 2018, pp. 160-169".
"Marsh, et al., Catalytic Graphitization by Iron of Isotropic Carbon from Polyfurfuryl Alcohol, 725-1090 K. A High Resolution Electron Microscope Study, Carbon, vol. 21, No. 1, 1987, 7 pages".
Melligan, et al., Pressurised pyrolysis of Miscanthus using a fixed bed reactor, Bioresource Technology 102 (2011) 3466-3470.
"Milosavljevic, et al., Thermal Effects in Cellulose Pyrolysis: Relationship to Char Formation Processes, Ind. Eng. Chem. Res. 1996, 35, 653-662".
Mochida, et al., Catalytic Graphitization of Non-Graphitizable Carbon by Chromium and Manganese Oxides, Carbon, 18, 7 pages.
Mok, et al., Effects of Pressure on Biomass Pyrolysis II. Heats of Reaction of Cellulose Pyrolysis, Thermochimca Acta, 68, 1983, 22 pages.
"Montoya, et al., Identification of the fractions responsible for morphology conservation in lignocellulosic pyrolysis: Visualization studies of sugarcane bagasse and its pseudo-components, Journal of Analytical and Applied Pyrolysis 123 (2017) 307-318".
Musellim, et al., Thermokinetic and TG/DSC-FTIR study of pea waste biomass pyrolysis, Applied Thermal Engineering 137 (2018) 54-61.
"Qin, et al., Influence of biomass components, temperature and pressure on the pyrolysis behavior and biochar properties of pine nut shells, Bioresource Technology vol. 313, Oct. 2020, 9 pages".
"Qu, et al., Experimental Study of Biomass Pyrolysis Based on Three Major Components: Hemicellulose, Cellulose, and Lignin, Ind. Eng. Chem. Res. 2011, 50, 10424-10433".
"Rabemanolontsoa, et al., Comparative study on chemical composition of various biomass species, RSC Advances, 2013, 3, 3946, 11 pages".
Rath, et al., Heat of wood pyrolysis, Fuel 82 (2003) 81-91.

"Recari, et al., Effect of temperature and pressure on characteristics and reactivity of biomass-derived chars, Bioresource Technology 170 (2014) 204-210".
"Ren, et al., Functionalization of Biomass Carbonaceous Aerogels: Selective Preparation of MnO2@CA Composites for Supercapacitors, ACS Appl. Mater. Interfaces 2014, 6, 9689?9697".
Rios, et al., Carbon foam prepared by pyrolysis of olive stones under steam, Carbon 44 (2006) 1448-1454.
"Rousset, et al., Pressure effect on the quality of eucalyptus wood charcoal for the steel industry: A statistical analysis approach, Fuel Processing Technology 92 (2011) 1890-1897".
Schroeter, et al., Melting cellulose, Cellulose 12: 159-165, 2005.
"Smith, et al., Chemical and morphological evaluation of chars produced from primary biomass constituents: Cellulose, xylan, and lignin, Biomass and Bioenergy 104 (2017) 17e35".
"Taherzadeh, et al., Characterization and Fermentation of Dilute-Acid Hydrolyzates from Wood, Ind. Eng. Chem. Res. 1997, 36, 4659-4665".
Teixeira, et al., Aerosol generation by reactive boiling ejection of molten cellulose, Energy Environ. Sci., 2011, 4, 4306, 16 pages.
"Wang, et al., Is Elevated Pressure Required to Achieve a High Fixed-Carbon Yield of Charcoal from Biomass? Part 2: The Importance of Particle Size, Energy Fuels 2013, 27, 2146?2156".
"Wang, et al., Is Elevated Pressure Required To Achieve a High Fixed-Carbon Yield of Charcoal from Biomass? Part 1: Round-Robin Results for Three Different Corncob Materials, Energy Fuels 2011, 25, 3251-3265".
"Wang, et al., A review on application of carbonaceous materials and carbon matrix composites for heat exchangers and heat sinks, International Journal of Refrigeration, 35, 2012, 20 pages".
"Williams, et al., The fundamentals of biocarbon formation at elevated pressure: From 1851 to the 21st century, Journal of Analytical and Applied Pyrolysis 113 (2015) 225-230".
"Wu, et al., Biomass-Derived Sponge-like Carbonaceous Hydrogels and Aerogels for Supercapacitors, ACS Nano 2013, 7, 4, 3589-3597 Publication Date: Apr. 2, 2013".
Yang, et al., Characteristics of hemicellulose, cellulose and lignin pyrolysis, Fuel 86 (2007) 1781-1788.
"Yang, et al., Preparation of mesocellular carbon foam and its application for lithium/oxygen battery, Electrochemistry Communications 11 (2009) 1127-1130".
Yuan, et al., Multifunctional Stiff Carbon Foam Derived from Bread, ACS Appl. Mater. Interfaces 2016, 8, 16852?16861.
"Zhang, et al., Preparation of a macroscopic, robust carbon-fiber monolith from filamentous fungi and its application in Li-S batteries, Green Chem., 2014, 16, 3926, 9 pages".
"Zhang, et al., Damaged starch derived carbon foam-supported heteropolyacid for catalytic conversion of cellulose: Improved catalytic performance and efficient reusability, Bioresource Technology 288 (2019) 121532, 8 pages".
Chen, et al., Carbon foam derived from various precursors, Carbon 44 (2006) 1535-1543.
"Amini, et al., Processing of strong and highly conductive carbon foams as electrode, Carbon 49 (2011) 3857-3864".
Antal, Jr., The Art, Science, and Technology of Charcoal Production, Ind. Eng. Chem. Res. 2003, 42, 1619-1640.
"Asmadi, et al., Gas- and solid/liquid-phase reactions during pyrolysis of softwood and hardwood lignins, Journal of Analytical and Applied Pyrolysis 92 (2011) 417-425".
"Liu, et al., Uniform Lithium Nucleation/Growth Induced by Lightweight Nitrogen-Doped Graphitic Carbon Foams for High-Performance Lithium Metal Anodes, Adv. Mater. 2018, 30, 1706216, 8 pages".
"Wu, et al., Ultralight, Flexible, and Fire-Resistant Carbon Nanofiber Aerogels from Bacterial Cellulose, Angew. Chem. Int. Ed. 2013, 52, 2925-2929".

\* cited by examiner

APPARATUS AND METHODS FOR FABRICATION OF CARBON FOAMS AND SILICON-CARBON COMPOSITE ANODES

CROSS-REFERENCE TO RELATED APPLICATIONS

This application claims priority to U.S. Provisional Patent Application Ser. No. 62/876,890 filed on Jul. 22, 2019, and U.S. Provisional Patent Application Ser. No. 62/979,726 filed on Feb. 21, 2020, both of which are herein incorporated by reference in their entirety.

GOVERNMENT RIGHTS

This invention was made with government support under Early-concept Grants for Exploratory Research, Grant No. 1835083, awarded by the National Science Foundation. The government has certain rights in the invention.

BACKGROUND

Field

Embodiments of the present disclosure generally relate to methods for fabrication of carbon foams and silicon-carbon composite anodes.

Description of the Related Art

Biomass and coal pyrolysis utilizes elevated temperatures to thermochemically deteriorate organic material into energy and useful products. The biomass or coal pyrolyzes as it is heated and releases volatile co-products in addition to forming solid carbon products. Carbon foams, however, are highly porous, carbonaceous solids with properties that make them favorable and promising materials in a wide array of high value applications. Among these properties, carbon foams are lightweight, oxidation and corrosion resistant, have a low thermal expansion coefficient, and have adjustable thermal and electrical conductivities. Because of these unique properties, carbon foams are well-suited in applications such as fire and thermal protection, fuel cell anode and gas diffusion layers, and catalyst and refractory support, as well as batteries.

Carbon foams exhibit favorable mechanical strength and electrical conductivity properties and have shown promise in replacing existing materials for various applications. Electrically conductive carbon foams are specifically desirable. Some carbon foams can be converted to graphitic foams where the carbon comprising the foam is converted into graphite by heating in specialized furnaces to at least 2,500° C. under inert gas. However, the development and utilization of carbon foams in battery and electrode applications has proved difficult. Moreover, the fabrication of carbon foams from environmentally benign feedstocks is not well developed.

Lithium (Li) ion batteries (LIB) are an integral part of modern life and are poised to become even more widely utilized as vehicle electrification and renewable energy storage deployment continue to grow. Efforts towards increasing energy density, longevity, and reducing cost, have focused on all battery components, including the anode. Silicon anodes have been proposed due to their high theoretical storage capacity (>3500 $mAh \cdot g^{-1}$) versus conventional graphite anodes (~350 $mAh \cdot g^{-1}$), but advancement of silicon anodes has been limited by stability issues. Namely, excessive volumetric expansion of the silicon occurs upon lithium insertion, causing pulverization of the silicon particles and cracking and adhesion loss in the anode. This structural damage reduces electrical contact within the anode, disrupts the solid electrolyte interface (SEI) layer, and shortens the battery cycle life.

Therefore, there is a need in the art for improved methods of carbon foam fabrication and for apparatus utilizing such carbon foams.

SUMMARY

In one embodiment, a carbon foam fabrication method is provided. The method includes pulverizing feedstock into a powder and filling a containment device with the powder, placing the containment device in a reactor coupled to a backpressure valve, pressurizing the reactor housing the containment device to subcritical or supercritical conditions for an environment of $CO_2$ or $N_2$, and loading the reactor in a furnace. The backpressure valve is coupled to a collection container, the furnace is heated at a constant heat rate until the reactor reaches a maximum temperature, the reactor is maintained at the maximum temperature for a period of time, the biomass is pyrolyzed to form carbon foam in the reactor, and a bio-oil co-product is collected in the collection container.

In another embodiment, a carbon foam fabrication method is provided. The method includes pulverizing feedstock into a powder, filling a containment device with the feedstock powder, placing the containment device in a reactor coupled to a backpressure valve, pressurizing the reactor housing the containment device to subcritical or supercritical conditions for an environment of $CO_2$ or $N_2$, loading the reactor into a furnace, heating the furnace at a constant heat rate until the reactor reaches a maximum temperature, exposing the reactor to the maximum temperature for a period of at least ten minutes, pyrolyzing the biomass to form carbon foam in the reactor, and cooling and depressurizing the reactor.

In another embodiment, a carbon foam fabrication method is provided. The method includes forming powder from a lignocellulosic or coal feedstock, combining silicon particles with the feedstock powder creating a feedstock mixture, wherein a silicon content of the feedstock mixture is between about 5 weight percent and about 30 weight percent, filling a containment device with the feedstock mixture, placing the containment device in a reactor, pressurizing the reactor housing the containment device to subcritical or supercritical conditions for an environment of $CO_2$ or $N_2$, loading the reactor in a furnace, and pyrolyzing the biomass to form carbon foam in the reactor.

In another embodiment, a silicon-carbon anode is provided. The anode includes a carbon foam comprising a matrix having a plurality of pores and silicon particles encapsulated within the matrix and/or the pores. A silicon content of the carbon foam is between about 1 weight percent and about 85 weight percent and the carbon foam comprising silicon is coupled to the current collector.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limited of its scope, and may admit to other equally effective embodiments.

DETAILED DESCRIPTION

The descriptions of various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable one of ordinary skill in the art to understand the aspects disclosed herein.

In an effort to explore the effect of high pressure pyrolysis on biomass or coal in $CO_2$ and other gas environments, various process parameters have been investigated and their impact on the composition of fabricated carbon foams and bio-oils are described herein. The composition of carbon foams can be altered for implementation as materials in a wide array of industries and applications, such as energy storage in batteries and battery components.

Process parameters such as gas environment, temperature, pressure, hold time, heating rate, and fluid flow rate are manipulated to produce carbon foams exhibiting variable composition, pore size distribution, electrical and thermal conductivities, and mechanical strength. Fabrication parameters such as biomass or coal precursor and particle size decomposition are also manipulated to influence the resultant quality and composition of carbon foam.

Due to the propensity of silicon anodes to exhibit relative instability, it is desirable to develop anodes which exhibit improved stability characteristics. Silicon-carbon composites are promising materials for enhancing silicon anode stability because silicon-carbon materials combine high performance electrical characteristics of silicon with the structural stability of carbon. Embodiments of the disclosure utilize a novel method to encapsulate silicon in a porous, electrically conductive lignocellulosic biomass-derived or coal-derived carbon foam matrix to serve as a lithium ion battery anode. In one embodiment, the lignocellulosic biomass-derived or coal-derived carbon foam matrix is also graphitized. The porous carbon matrix provides structural integrity and pore volume for silicon swelling during lithiation, while the silicon content increases the electrical capacity of the anode. The carbon foam fabrication process utilizes a high-pressure pyrolysis technique described in detail herein.

Aspects described herein demonstrate a novel and economical approach for high pressure pyrolysis fabrication of improved quality carbon foams. In some embodiments, process parameters, such as temperature, pressure, hold time, heating rate, and fluid flow rate, are tuned to improve the properties of carbon foams. Carbon foams fabricated according to the embodiments described herein exhibit at least one or more of the following characteristics: lightweight, oxidation resistance, corrosion resistance, low thermal expansion coefficients, and tailorable thermal and electrical conductivities.

Figure 1A:
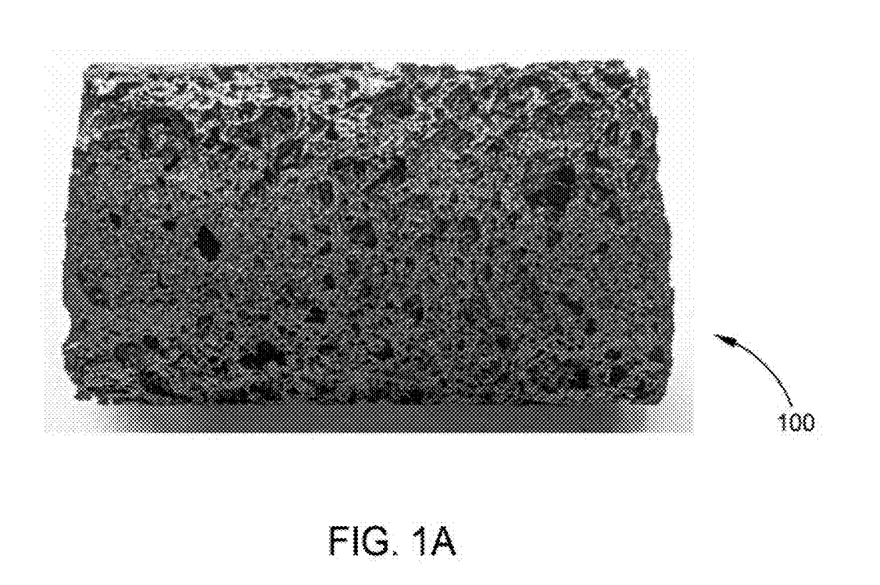
FIG. 1A illustrates a macroscopic image of carbon foam produced from milled corn stover powder via supercritical $CO_2$ pyrolysis according to an embodiment of the disclosure.

In one embodiment, a method of fabricating carbon foam, such as the carbon foam 100 illustrated in FIG. 1A, based on the pyrolysis of biomass or coal includes utilization of one of the following feedstock materials: corn stover, pine, *miscanthus giganteus* ("*miscanthus*"), cellulose, hemicellulose, lignin, or bituminous coal. Lignocellulose materials are the most plentifully available biomasses on earth, with hemicellulose, cellulose and lignin being major components of lignocellulose. Because of their renewable and inexpensive properties, lignocellulosic biomass is an attractive feedstock for the fabrication of carbon foam and bio-oil. Feedstock materials described herein are contemplated as being usable in their native form, solid form, powdered form or other morphology, whether compacted or uncompacted.

In one embodiment, carbon foam is fabricated by initially grinding feedstock to a powder with a particle size of less than about 0.40 mm. It is contemplated that the smaller particle size is advantageous to carbon foam fabrication. The small particle size of the powder is favorable for moldability of the carbon foam, as the feedstock powder can be pressed into desired shapes prior to foaming. After reaching the desired particle size range, the ground feedstock is loaded into a containment device. In one embodiment, between about 15 mL to about 25 mL of ground feedstock is loaded into a containment device. In another embodiment, a range of a ratio of the volume of the ground feedstock loaded into the containment device to the volume of the reactor is about 1:10 to about 8.5:10, such as about 1.5:10 to about 8:10, such as about 2.5:10 to about 6:10. The containment device acts as a housing unit for the feedstock and a mold or casting form for the carbon foam to be produced. The containment device remains permeable to or is otherwise in fluid communication with a reactor environment to enable fluids to pass through the device and contact the biomass, and for evolved products to escape from the containment device. The containment device is fabricated from a material selected to withstand high temperatures and pressures during fabrication. In one embodiment, the containment device is a fine stainless steel mesh packet. In another embodiment, aluminum foil is used as the containment device. In another embodiment, a glass test tube is used as the containment device.

Various other materials which maintain chemical and mechanical integrity at the process conditions described herein, such as aluminum, stainless steel, and alloys thereof, are contemplated as materials suitable for the containment device. In one embodiment, a volume of the containment device is shaped or otherwise configured as a mold to form a carbon foam having a desired morphology, such as a sheet, tube, pellet, block, or other shape. In one embodiment, surfaces of the containment device which define the volume are coated to facilitate easy release of carbon foams from the containment device after fabrication of the foam. For example, the coating is a material which is selected to exhibit "non-stick" or hydrophobic properties, such as polytetrafluoroethylene or the like. The coating material is also selected to exhibit chemical and thermal stability at the temperatures and pressures utilized in the carbon foam fabrication processes described herein.

In one example, a containment device, such as a mesh packet, is placed in a reactor coupled to a backpressure valve. In one embodiment, the reactor is fabricated from a material suitable for maintenance of elevated temperature and pressure environments therein. Example, of suitable materials include stainless steel, aluminum, and alloys and combinations thereof.

In some embodiments, carbon foam is fabricated by initially grinding feedstock to a powder with a particle size range of up to about 0.40 mm and then compressing the feedstock into pellets. In one embodiment, the feedstock is compressed at room temperature at a pressure of about 100,000 psi. It is contemplated that compressing feedstock at higher temperatures improves performance of the ultimately formed carbon foam. In one embodiment, the feedstock is compressed into pellets with a diameter of between about 5 mm and about 20 mm, such as between about 10 mm and about 15 mm, such as about 13 mm. In one embodiment, the mass of the compressed pellets between about 1 gram and about 15 grams, such as between about 3 grams and about 10 grams, for example, between about 5 grams and about 7 grams. However, it is contemplated that other mass ranges are within the scope of this disclosure and may be selected depending upon the scale of production and the properties desired from the carbon foams. Pellet formation enables the formation of loose feedstock, such as powdered material, into a manageable form factor for processing. Compression of feedstock also enables the ultimately formed carbon foam to exhibit desirable mechanical integrity with improved pore distribution.

Following compression, ground feedstock formed into pellets is loaded into the containment device. In one embodiment, between about 15 mL to about 20 mL of ground feedstock is utilized, however, any suitable amount of feedstock is contemplated. The containment device is then placed in the reactor coupled to the backpressure valve. In another embodiment, the feedstock is compressed into sheets with a thickness of between about 0.1 inches and about 1 inch, such as between about 0.3 inches and about 0.7 inches, for example, about 0.5 inches. In this embodiment, sheets of feedstock have an area of about 6 square inches or greater, about 36 square inches or greater, or about 72 square inches or greater.

In one embodiment, carbon foam is fabricated under supercritical conditions for pyrolysis. In one embodiment, the reactor housing the containment device filled with feedstock is pressurized to supercritical conditions for a given fluid environment of $CO_2$ or $N_2$. Thus, temperature and pressure parameters are maintained within the reactor to generate supercritical $CO_2$ and/or supercritical $N_2$. Pressurization causes the fluid to flow over the feedstock sample such that the volume of the reactor is swept periodically, such as about once per minute. In other examples, the reactor volume is swept between once per 30 seconds and once per 5 minutes. As such, a volume of the reactor is overturned and/or replaced periodically. In the embodiment where the reactor volume is swept once per minute, the reactor has an exemplary volume of about 100 mL and the fluid flow rate is about 100 mL/min. It is contemplated that the reactor volume and fluid flow rate are selected based upon the amount of feedstock to be pyrolyzed and may be increased to facilitate higher volume foam production.

Following pressurization, the reactor is heated within a furnace. A backpressure valve is also coupled to the reactor and a collection container, such as a flask or the like, is coupled to the backpressure valve. The collection container is maintained at a temperature of between about −65° C. to about −85° C. In one example, the collection container is disposed in a dry ice bath. Next, the reactor is heated inside the furnace at a rate of between about 1° C./min and about 50° C./min, such as between about 5° C./min and about 25° C./min, for example, about 10° C./min until the temperature of the reactor reaches a temperature of at least 250° C. The maximum temperature of the reactor achieved during heating is then kept steady for a duration of time between about 1 minute and about 100 minutes, such as between about 2 minutes and about 50 minutes, such as between about 5 minutes and about 15 minutes, for example, about 10 minutes. During this time period, the feedstock pyrolysis produces volatile co-products and carbon foam. The carbon foam remains in the reactor housing, and more specifically within the containment device, while volatile co-products flow out of the reactor. In one embodiment, the volatile co-products flow through the backpressure valve and are collected in the collection container. As such, the pyrolysis co-product gathers and condenses inside the collection container.

In some embodiments, carbon foam is fabricated under subcritical conditions for pyrolysis. In one embodiment, the reactor housing the containment device filled with feedstock is pressurized to subcritical conditions for a given fluid environment of $CO_2$ or $N_2$. In this embodiment, the pressure is about 3.4 MPa or greater up to the critical point of the fluid for a given temperature. It is contemplated that the temperature of the process may also be modulated, in combination the pressure, to generate desirable subcritical processing condition. Pressurization causes the fluid to flow over the feedstock sample such that the volume of the reactor is overturned and/or replaced periodically, such as once per minute. In other examples, the reactor volume is swept between once per 30 seconds and once per 5 minutes. As such, a volume of the reactor is overturned and/or replaced periodically. In the embodiment where the reactor volume is swept once per minute, the reactor has an exemplary volume of about 100 mL and the fluid flow rate is about 100 mL/min. It is contemplated that the reactor volume and fluid flow rate are selected based upon the amount of feedstock to be pyrolyzed and may be increased to facilitate higher volume foam production.

Following pressurization, the reactor is heated in the furnace which has the backpressure valve coupled between the reactor and the collection container. The collection container maintained at a temperature of between about −65° C. to about −85° C. In one embodiment, the collection container is disposed in a dry ice bath. Next, the reactor is heated inside the furnace at a rate of between about 1° C./min and about 50° C./min, such as between about 5° C./min and about 25° C./min, for example, about 10° C./min until the temperature of the reactor reaches a temperature of at least 250° C. The maximum temperature of the reactor achieved during heating is then kept steady for a duration of time between about 1 minute and about 100 minutes, such as between about 2 minutes and about 50 minutes, such as between about 5 minutes and about 15 minutes, for example, about 10 minutes. During this time period, the feedstock pyrolysis produces volatile co-products and carbon foam. The carbon foam remains in the reactor housing while volatile co-products flow out of the reactor to the collection container via the backpressure valve. The pyrolysis co-product gathers and condenses inside the collection container.

As described above, the pyrolysis process generates co-products. Bio-oil is one such co-product. To facilitate characterization of the co-product, a bio-oil specimen is weighed immediately following collection and condensation in the collection container. Bio-oil composition is analyzed via gas chromatography-mass spectrometry (GC-MS) to identify major compounds in the pyrolysis oil. GC-MS is useful in illustrating the complexity of compositions in the liquid oil as the pyrolysis temperature and pressure increases. Thus, the processing conditions may be tailored not only to produce carbon foams, but bio-oils which exhibit desirable properties.

Figure 1B:
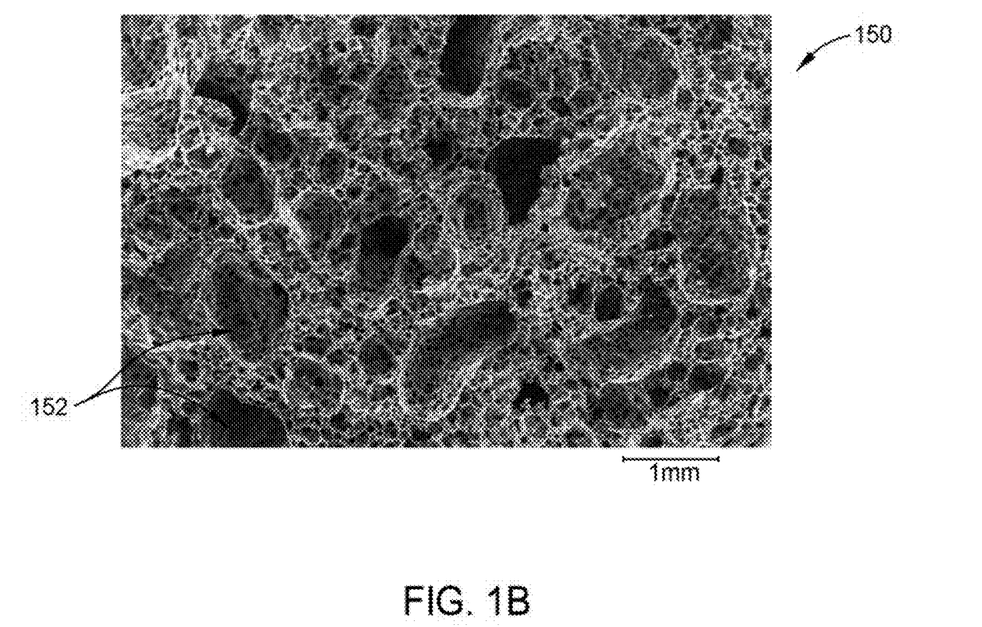
FIG. 1B illustrates a scanning electron micrograph (SEM) image of carbon foam produced from milled corn stover powder via supercritical $CO_2$ pyrolysis according to an embodiment of the disclosure.

Carbon foams are characterized in terms of composition, pore size distribution, electrical and thermal conductivities, and strength. Carbon foam specimens are weighed immediately following fabrication. Thermal conductivity is measured using a heat flow meter. Electrical conductivity is measured using a conductivity meter and probe. Bulk density of the specimen is calculated by measuring the volume and mass. Compressive strength is determined by loading the specimens under displacement control until failure. Porosity is characterized by measuring macro-, meso-, and micro-pores visible under a scanning electron microscope (SEM) producing SEM images, such as SEM image 150 illustrated in FIG. 1B. The SEM image 150 depicts the pores 152 of the carbon foam 100. For a given volume of carbon foam in one embodiment, about 5 percent of the volume is pore space and about 95 percent of the volume is carbon. In another embodiment, about 25 percent of the volume is pore space and about 75 percent of the volume is carbon. In another embodiment, about 50 percent of the volume is pore space and about 50 percent of the volume is carbon. In another embodiment, about 70 percent of the volume is pore space and about 30 percent of the volume is carbon. In another embodiment, about 85 percent of the volume is pore space and about 15 percent of the volume is carbon.

It is contemplated that embodiments herein can be used to increase product yield and improve composition of carbon foams engineered under high pressure and high temperature conditions using pretreated specimens of lignocellulosic biomass which is an economically advantageous and renewable resource. Embodiments described herein provide for selection of a feedstock specimen which is pulverized into a particle size range of less than about 0.40 mm. Pulverizing and compressing the loose feedstock enables greater moldability and uniformity during processing resulting in more consistent carbon foams which improve the mechanical integrity and pore distribution of the final product. Pretreating, e.g. pulverization and/or compression, the feedstock enables break-down of the lignocellulose into its three base components. Lignocellulose is a combination of hemicellulose, cellulose, and lignin, wherein lignin is the main barrier to precursor transformation. Lignin is found in the cell walls of a plant and functions to provide support and impermeability into the cell. It is believed that lignin is responsible for the mechanical resistance of the cell against foreign attacks attempting to destroy the cell structure; therefore, decomposition prior to pyrolysis facilitates reduction of precursor transformation resistance. Additionally, the loose, uncompact powder formed by pulverization provides additional surface area to increase the rate of reaction. Because pyrolization occurs rapidly, rapid heat transfer through the particles is enhanced by grinding the feedstock to a small particle size.

It is contemplated that other processes beyond pulverization may also be utilized to break down the feedstock for the purpose of preventing mechanical resistance with the addition of compressing the loose powder into pellets. Forming pellets prior to processing demonstrates ability of the feedstock sample to ultimately form carbon foams. There are benefits to characterization of carbon foam at a macro-pellet size compared to a molecular level, however, it is believed that carbon foam compositions resulting from the recombination of lignin exhibit a reduction in surface area for the pyrolysis reaction. Accordingly, feedstock preparation processes which increase the surface area of the feedstock for pyrolysis are contemplated as being advantageously utilized in the carbon foam production processes described herein.

Embodiments described herein demonstrate successful production of carbon foam from multiple feedstocks without the introduction of water into a gas environment. Embodiments provide for selection of various feedstock specimens to produce carbon foams: (1) corn stover, (2) pine, (3) *Miscanthus*, (4) cellulose, (5) hemicellulose, (6) lignin or (7) bituminous coal.

Lipids are insoluble in water and result in reduced moisture contents in lipid-excess biomasses, such as olive stones. An aqueous environment remedies the deficiencies in water content of lipid-excess biomasses; however, lignocellulose devoid of the excess fat can perform well in a non-aqueous environment. Accordingly, the addition of water increases the mechanical strength of the foams but is an optional process parameter to carbon foam formation. Embodiments described herein contemplate aqueous and non-aqueous environments for pyrolysis depending upon the type of precursor utilized and amount of carbon foam fabrication anticipated.

In one embodiment, pyrolysis of a biomass feedstock is performed utilizing $CO_2$ and water ($H_2O$). When water, in the form of preheated steam, is introduced in the reactor along with $CO_2$, the water addition increases the mechanical strength of the produced foams. Alternatively, an $N_2$ environment may be utilized to produce carbon foams from feedstock under the same conditions as $CO_2$.

Pyrolysis of feedstocks at temperatures between 200° C. and 400° C. cause large transformations to occur. In one embodiment, pyrolysis is performed at a 500° C. *maximum* temperature and a pressure of 10.3 MPa. The critical point for $CO_2$ is 31.10° C. and 7.39 MPa and the critical point for $N_2$ is −146.9° C. and 3.39 MPa. Carbon foam fabrication conducted at 700° C./10.3 MPa and 500° C./13.8 MPa, supercritical conditions for both $CO_2$ and $N_2$, showed similar results to the 500° C./10.3 MPa embodiment.

In one embodiment, carbon foam fabrication is performed at subcritical conditions. In this embodiment, feedstock is processed in $CO_2$ at 500° C./6.9 MPa, subcritical conditions for $CO_2$, and foams exhibiting similar characteristics to the 500° C./10.3 MPa, supercritical embodiment were obtained. However, lower pressure tests conducted in $CO_2$ at 500° C./4.1 MPa and 500° C./2.1 MPa (subcritical conditions) resulted in poor quality, structurally weak foams. Foam production occurs at a pressure greater than about 3.4 MPa. These results suggest that higher pressures enable high-quality foam production.

Figure 4:
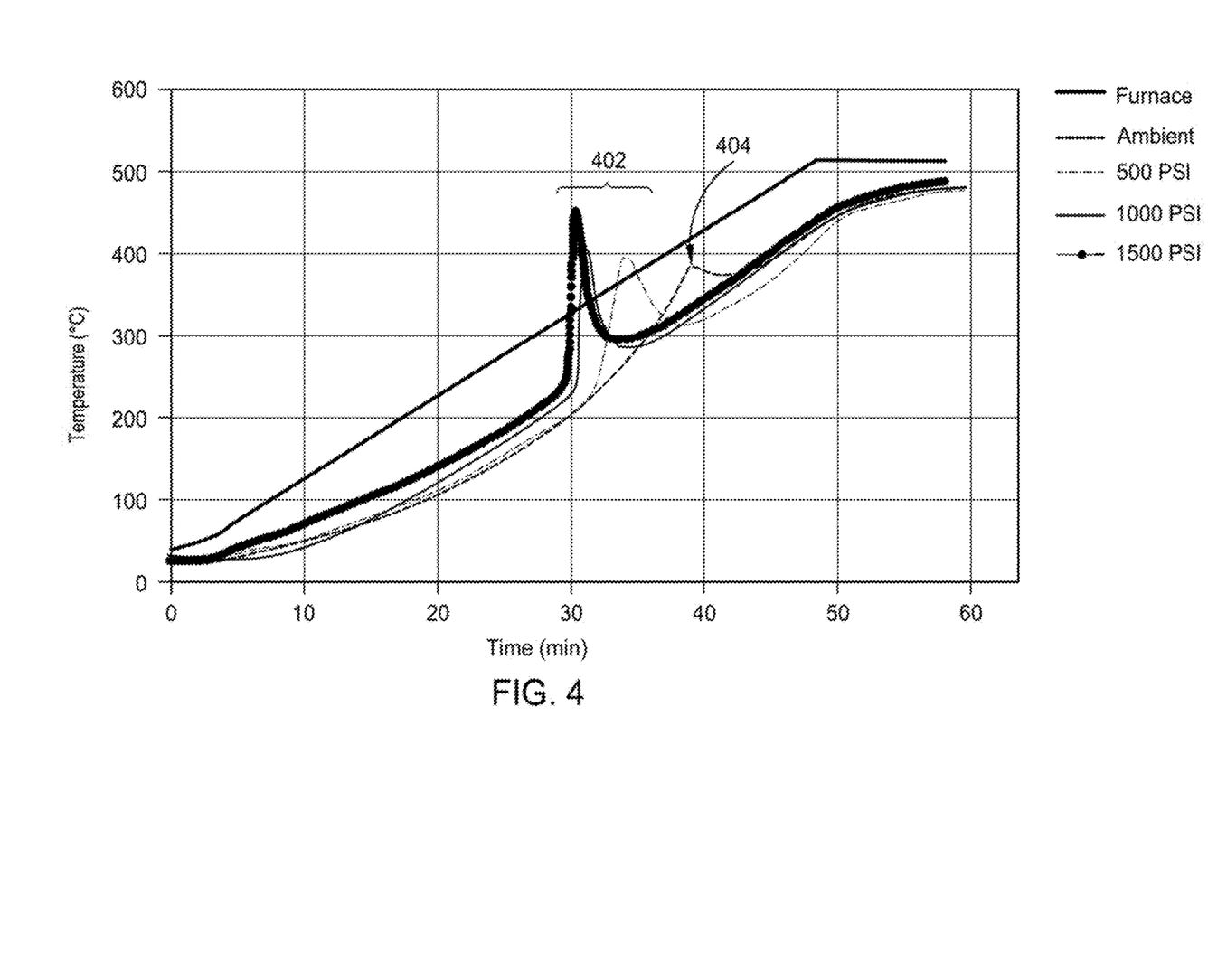
FIG. 4 illustrates temperature profiles of corn stover pellets pyrolyzed at various pressures according to an embodiment of the disclosure.

FIG. 4 depicts the temperature profiles of corn stover feedstock pellets that were pyrolyzed in $CO_2$ at various pressures with a heat rate of 10° C./min. The pressures include 500 psi, 1000 psi, 1500 psi, and ambient pressure.

The temperature of the feedstock and the furnace are recorded in FIG. 400. The feedstock underwent an exothermic reaction during pyrolysis as depicted by the peaks in range 402 occurring between about 30 and about 40 minutes of heating. Increasing the pressure resulted in the reaction responsible for foam production initiating at a lower temperature and occurring at a faster rate while also increasing the maximum temperature of the reaction. At a pressure of 500 psi, the reaction occurred about 35 minutes into heating when the furnace was about 400° C. At a pressure of 1000 psi, the reaction occurred about 32 minutes into heating when the furnace was about 350° C. At a pressure of 1500 psi, the reaction occurred about 30 minutes into heating when the furnace was about 325° C. While an exothermal spike is depicted in area 404, no foam production occurred while at ambient pressure. Thus, elevated pressures are believed to facilitate carbon foam production.

Hold time of the reactor at the aforementioned maximum processing temperatures was analyzed to assess its impact on the quality of carbon foams and bio-oils, yet no differences were observed from the different hold times. Hold times of 15 minutes, 45 minutes, 1 hour, and 3 hours were examined with no changes in carbon foam composition. Surprisingly, carbon foam fabrication according to the embodiments described herein is at least partially agnostic to hold time at a given processing temperature which indicates that carbon foams are produced during temperature ramping. Such results are economically advantageous in that hold times are reduced or eliminated and foam fabrication throughput is increased due to foam formation during temperature ramping at the elevated pressures described herein.

Additionally, it is contemplated that manipulation of heat rate in carbon foam fabrication processes result in variations in final foam characteristics, such as density and compressive strength. Tests were conducted at a first heating rate and a second heating rate greater than the first heating rate. In one embodiment, the first heating rate is between about 1° C./min and about 10° C./min, such as about 5° C./min. The second heating rate is between about 80° C./min and about 120° C./min, such as about 100° C./min. The first heating rate resulted in poor quality, structurally weak foams that had a tendency to crumble. Additionally, individual biomass particles that had not been converted to foam were visible.

The second heating rate, between about 80° C./min and about 120° C./min, produced more uniform foams with significantly greater mechanical integrity. The increased heating rate increases the velocity of expanding spherical gas bubbles and affects pore homogeneity. Increased density and compressive strength of foams is partially the result of elevated heating rates which decrease pore size of the foams. The fluid flow rate, or the frequency at which the volume of the reactor is swept, also impacts resultant carbon foam properties. In order to improve porosity, mechanical strength, and compressive strength, heat rate and flow rate variations may be modulated to fabricate carbon foams having desirable morphological characteristics.

In one embodiment, the electrical conductivity was measured pre-heat treatment and post-heat treatment. In this embodiment, corn stover and pine were the feedstock used. The corn stover feedstock and the pine feedstock were each compressed into pellets. The pellets were loaded into a mesh packet. The mesh packet was then placed in a reactor coupled to a back pressure valve and pressurized to supercritical conditions for a given fluid environment of $CO_2$. In this embodiment, the pressure is at least 10.34 MPa. The reactor was heated inside the furnace at a rate of about 10° C./min until the temperature of the reactor reached about 500° C. The temperature of the reactor was then kept steady at about 500° C. for a duration of about 10 minutes. The produced foams were then heat treated to increase electrical conductivity. The pressure was held at or above ambient pressure when using $CO_2$ or $N_2$ gas and the reactor was heated inside the furnace at a rate of at least 30° C./min until the temperature of the reactor reached a temperature of at least 860° C. The temperature of the reactor was then kept steady at about 860° C. for a duration of at least 15 minutes. The reactor was then cooled to room temperature.

The electrical conductivity of the foam was tested prior to heat treatment using a conductivity meter and probe and again after heat treatment. The results of the electrical conductivity of the foams can be seen in Table 1. It should be noted that lower resistivity indicates greater conductivity. For comparison, the electrical resistivity of some common materials can be seen in Table 3.

TABLE 1

Electrical Resistivity of Heat Treated Carbon Foams

| Foam | Electrical Resistivity ($\Omega$ m) before heat treatment | Electrical Resistivity ($\Omega$ m) after heat treatment |
| --- | --- | --- |
| Corn stover | No measurable conductance | $4.5 \times 10^{-3}$ |
| Pine | No measurable conductance | $3.3 \times 10^{-3}$ |

Additionally, it is contemplated that the addition of materials such as graphite or ferrocene, an iron containing compound, prior to heat treatment increases the electrical conductivity of the biomass-derived carbon foams. In one embodiment, graphite and/or ferrocene are mixed with ground biomass feedstock. In this embodiment, corn stover is the feedstock. Varying mass ratios of feedstock with graphite and/or ferrocene were used. In one embodiment, four different mass ratios were tested. The first mass ratio was 4% ferrocene and 96% corn stover. The second mass ratio was 5% ferrocene, 5% graphite, and 90% corn stover. The third mass ratio was 10% ferrocene, 10% graphite, and 80% corn stover. The fourth mass ratio was 10% graphite and 90% corn stover. The mass ratios of the resulting foam were different due to loss of corn stover mass, ferrocene mass, and graphite mass during the foaming process.

The corn stover mixtures of varying mass ratios were each compressed into pellets with a diameter of about 13 mm. The pellets were loaded into a mesh packet. The mesh packet was then placed in a reactor coupled to a back pressure valve and pressurized to supercritical conditions for a given fluid environment of $CO_2$. In this embodiment, the pressure is at least 10.6 MPa. The reactor was heated inside the furnace at a rate of about 10° C./min until the temperature of the reactor reached about 500° C. The temperature of the reactor was then kept steady at about 500° C. for a duration of about 10 minutes. The produced foams were then heat treated to increase electrical conductivity. The pressure was held at or above ambient pressure when using $CO_2$ or $N_2$ gas and the reactor was heated inside the furnace at a rate of at least 30° C./min until the temperature of the reactor reached a temperature of at least 860° C. The temperature of the reactor was then kept steady at about 860° C. for a duration of at least 10 minutes. The reactor was then cooled to room temperature.

The electrical conductivity of the foam was tested prior to heat treatment using a conductivity meter and probe and again after heat treatment. The results of the electrical conductivity of the foams can be seen in Table 2. It should be noted that lower resistivity indicates greater conductivity.

For comparison, the electrical resistivity of some common materials can be seen in Table 3.

TABLE 2

Electrical Resistivity of Produced Carbon Foams

| Treatment | Electrical Resistivity ($\Omega$ m) Before heat treatment | Electrical Resistivity ($\Omega$ m) After heat treatment |
|---|---|---|
| 4% Iron | Not measurable conductance | $1.6 \times 10^{-2}$ |
| 10% Graphite | Minimal measurable conductance | $6.7 \times 10^{-1}$ |
| 5% Iron + 5% Graphite | Minimal measurable conductance | $2.6 \times 10^{-3}$ |
| 10% Iron + 10% Graphite | Minimal measurable | $1.2 \times 10^{-3}$ |

TABLE 3

Electrical Resistivities of Common Materials

| Compound | Electrical Resistivity ($\Omega$ m) |
|---|---|
| Copper | $1.68 \times 10^{-8}$ |
| Carbon Steel | $1.43 \times 10^{-7}$ |
| Graphite | $4 \times 10^{-6}$ (parallel to basal plane) |
|  | $3 \times 10^{-3}$ (across basal plane) |
| Sea Water | $2 \times 10^{-1}$ |
| Wood (damp) | $5 \times 10^{4}$ |
| Rubber | $10^{13}$ |
| Teflon | $10^{24}$ |

The results indicate that heat treatment of the carbon foams increases electrical conductivity of the carbon foams. While the foregoing is directed to carbon foam production processes, other and further embodiments include post-processing of carbon foams. Typical carbon foam production involves post-foam production heat treatment; therefore, foam properties pre-heat treatment and post-heat treatment are contemplated as being within the scope of the disclosure.

It is also contemplated that the carbon foams may be doped with other materials, such as silicon, during foam formation.

Conventional battery anode graphite is derived from fossil sources and highly refined using multi-step processing and toxic chemicals, which translates to a significant positive carbon footprint and negative environmental impacts. Current production processes of graphite anodes are also expensive. Embodiments of the present disclosure utilize biomass residues which are inexpensive and have a potentially small or even negative carbon footprint, as well as inexpensive coal and coal residues or other coal particulate matter such as fines. The feedstock and processing method together are conducive to anode production at large scales.

Embodiments of the disclosure employ a production method which is environmentally benign and inexpensive compared with current graphite anode production methods, and which enables integration of high levels of Si into the anode. In one embodiment, fabrication of the composite silicon-carbon anode is an encapsulation-based approach enabling improved anode integrity and protection of embedded Si against pulverization and solid electrolyte interface (SEI) growth during lithiation.

Figure 2:
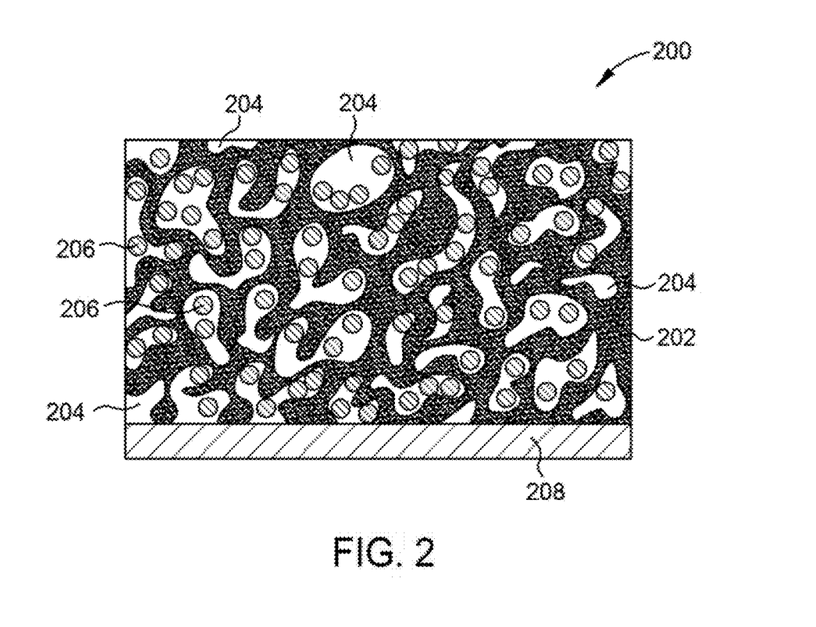
FIG. 2 illustrates a schematic cross-sectional view of a composite silicon-carbon anode according to an embodiment of the disclosure.

FIG. 2 illustrates a schematic cross-sectional view of a composite silicon-carbon anode 200 according to an embodiment of the disclosure. The anode 200 includes a carbon foam 202, such as the carbon foams described herein, which is disposed on a current collector 208. The current collector 208 is fabricated from a metallic material, such as copper, aluminum, iron, stainless steel, titanium, or alloys thereof, and various other suitable materials. In one embodiment, the current collector 208 is a foil or other similar material. In certain embodiments, the current collector 208 is optional. The carbon foam 202 forms a matrix having a plurality of pores 204 formed therein. The pores 204 are open spaces formed within the matrix which are substantially devoid of carbon. In one embodiment, the pores 204 have widths or diameters, depending upon pore morphology, between about 1 micrometer and about 500 micrometers. In certain embodiments, the pores 204 have widths or diameters on the sub-micron scale, depending upon the desired carbon foam characteristics.

The carbon foam 202 is utilized to form a matrix or superstructure within which silicon particles 206 are embedded or encapsulated. In the illustrated embodiment, the silicon particles 206 are disposed within the pores 204. In an alternative embodiment, the silicon particles 206 are embedded within the matrix of the carbon foam 202. In one embodiment, the silicon particles 206 are disposed within the matrix of the carbon foam 202 and within the pores 204. When the silicon particles 206 are in the liquid phase as the foam solidifies, the silicon particles are embedded in the matrix of the carbon foam 202. When silicon particles 206 are in the gaseous phase as the foam solidifies, the silicon particles 206 are disposed with in the pores 204 of the carbon foams 202.

In one embodiment, the silicon content of the anode 200 is greater than about 30 weight percent, for example, about 50 weight percent or greater. In this embodiment, the carbon to silicon ratio of the anode is between about 2:1 and about 1:2. Silicon doping of the carbon foam 202 with about 30 weight percent silicon does not adversely impact the structural integrity of the carbon foam 202. Significantly higher silicon dopant amounts, such as 50 weight percent or greater, are possible because little or no structural integrity loss is observed due to the morphology of the carbon foam 202. In addition, loss of carbon foam 202 integrity at higher dopant levels is not necessarily an impediment to anode success, as the Si-laden foams can be milled, slurried, and tape cast to form anodes while retaining micro- and meso-scale encapsulation of silicon. Thus, multiple anode forming techniques may be utilized to mitigate the risks associated with high Si loading of the carbon foam 202.

Additionally, it is contemplated that the addition of materials such as graphite or ferrocene prior to heat treatment increases the electrical conductivity of the silicon anodes. In one embodiment, graphite and/or ferrocene are mixed with ground feedstock and silicon nanoparticles. In this embodiment, corn stover is the feed stock and varying mass ratios of feedstock, silicon, and graphite or ferrocene are used. In one embodiment, two different mass ratios were tested. For example, the first mass ratio was 6% ferrocene, 9% silicon nanoparticles, and 85% corn stover. The second mass ratio was 6% graphite, 9% silicon nanoparticles, and 85% corn stover. The mass ratios of the resulting foam are different due to loss of corn stover mass, ferrocene mass, and graphite mass during the foaming process.

The corn stover mixtures of varying mass ratios were mixed together and each compressed into pellets with a diameter of about 13 mm. In one embodiment, the compounds of the corn stover mixtures are mixed by stirring in a beaker. Variations of mixing the compounds, such as blending, are contemplated to ensure complete or substantially complete dispersion of silicon nanoparticles. The pellets were loaded into a mesh packet. The mesh packet was then placed in a stainless steel reactor coupled to a back pressure valve and pressurized to supercritical conditions for a given fluid environment of $CO_2$. In this embodiment, the pressure is at least 10.6 MPa. The reactor was heated inside the furnace at a rate of 10° C./min until the reactor reached a temperature of about 500° C. The temperature of the reactor was then kept steady at about 500° C. for a duration of about 10 minutes. The produced foams were then heat treated. The pressure was held at ambient pressure and the reactor was heated inside the furnace at a rate of at least 30° C./min until the temperature of the reactor reached a temperature of at least 860° C. The maximum temperature of the reactor achieved during heating is then kept steady for a duration of time. The reactor was then cooled to room temperature.

Figure 3:
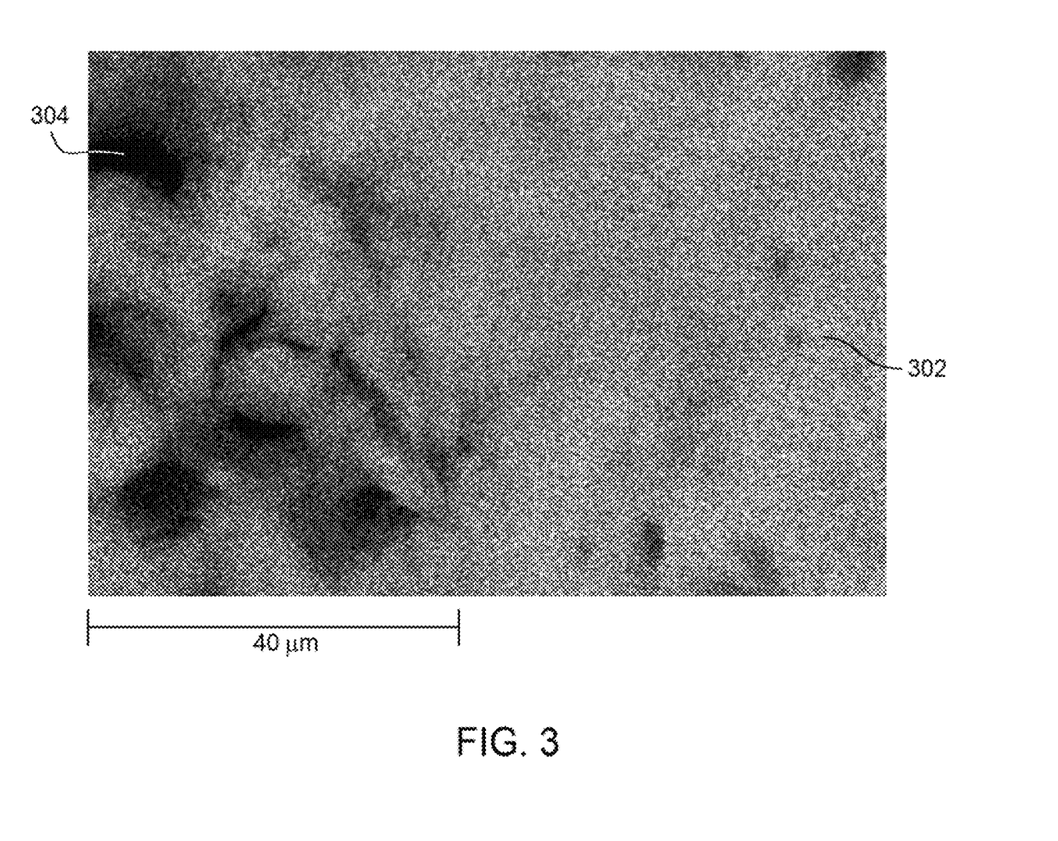
FIG. 3 illustrates an energy dispersive X-ray spectroscopy map of silicon concentration in silicon-doped carbon foam according to an embodiment of the disclosure.

The produced foams were analyzed by energy dispersive x-ray spectroscopy (EDXS) as illustrated in FIG. 3. The EDXS map illustrates the dispersion of silicon nanoparticles in the foam at the micron scale. The lighter colored area 302 represents a greater concentration of silicon particles, such as silicon particles 206. The darker colored area 304 represents a lower concentration of silicon particles. Area 304 is a pore, such as pore 204, formed in the matrix and substantially void of carbon. In this embodiment, silicon nanoparticles have a diameter of between about 20 nanometers to about 30 nanometers.

Anode degradation and reduced battery performance is a potential consequence of silicon loading of silicon-carbon anodes due to pulverization of silicon particles, SEI formation on the surface of the silicon, or combinations thereof. However, due to the unique carbon foam fabrication processes described herein, the carbon foam materials and processing methods are altered or otherwise modulated to minimize potential adverse effects of silicon doping. For example, properties of the carbon foam, such as density and pore size, are tailored during foam fabrication to ensure integrity of the ultimately formed anode. In one embodiment, carbon foams with encapsulated silicon are milled and tape cast onto a current collector through a slurrying process utilizing a binder. Non-limiting examples of a binder material for adhering the silicon doped carbon foam to the current collector include styrene-butadiene rubber and polyvinylidene fluoride, among others. In another embodiment, anodes are directly formed during the silicon-carbon composite anode fabrication process. Such a process includes embedding the current collector within the anode during fabrication. In this embodiment, the utilization of a binder is reduced or eliminated and may reduce fabrication cost while increasing anode performance.

Embodiments of the disclosure provide silicon-carbon composite anodes with a weight percent silicon content range of about 0 weight percent to about 85 weight percent, such as about 1 weight percent to about 60 weight percent, such as 2 weight percent to about 40 weight percent, such as about 5 weight percent to about 30 weight percent. The silicon-carbon composite anodes are assembled into full cell batteries in a coin cell configuration or other suitable configuration. The silicon-carbon composite anodes are believed to exhibit a specific energy of greater than about 350 Wh/kg @ C/3, an energy density of greater than about 750 Wh/L @ C/3, and a calendar life and cycle life having less than about 20% energy fade and C/3 deep discharge to 350 Wh/g with less than about 20% energy fade, respectively, over 5 years and 3,000 cycles or 10 years and 1,000 cycles. The aforementioned battery performance characteristics are enabled by utilization of the carbon foams described herein to provide structurally robust composite anodes which minimize the probability of anode degradation or destruction. Specifically, the carbon foams described herein provide structural support and pores for silicon expansion and protection to maintain anode integrity.

Composite silicon-carbon anodes fabricated according to the embodiments described herein provide various advantages over conventional composite anodes. For example, the embodiments described herein utilize integration of high weight percentages of silicon into silicon-carbon composites, which dramatically increases the specific capacity of such anodes as compared to conventional graphite anodes or composite anodes loaded with low levels of silicon. The high silicon loading is enabled through encapsulation during the carbon foam fabrication processes described herein.

Composite silicon-carbon anodes of the present disclosure also mitigate or eliminate anode degradation and retain anode performance over repeated cycling by using silicon encapsulation within the silicon-carbon composite anodes. The composite structure enables volumetric expansion of silicon in the pore space within the carbon foam during lithiation while maintaining structural integrity and electrical contact within the anode. SEI growth on the silicon particles is also reduced or eliminated. The carbon source for the silicon-carbon anodes is also a low cost, renewable biomass material, when biomass is used as feedstock, as opposed to non-renewable and high cost fossil-derived graphite from which conventional anodes are produced.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed here.

Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments, and advantages described are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

While the foregoing is directed to embodiments of the present disclosure, other and further embodiments of the disclosure may be devised without departing from the basic scope thereof, and the scope thereof is determined by the claims that follow.

What is claimed is:
1. A carbon foam fabrication method, comprising:
pulverizing feedstock into a powder having a particle size less than about 0.40 mm;
compressing the powder into pellets;
generating subcritical or supercritical conditions for an environment of $CO_2$ or $N_2$;
placing the pellets in the subcritical or supercritical conditions;

heating the pellets at a constant heat rate until the environment of $CO_2$ or $N_2$ reaches a maximum temperature;
pyrolyzing the pellets to form carbon foam; and
collecting a bio-oil co-product.

2. The method of claim 1, wherein the pulverized feedstock is one or more of corn stover, pine, *miscanthus giganteus*, hemicellulose, cellulose, lignin, bituminous coal, or combinations or mixtures thereof.

3. A carbon foam fabrication method, comprising:
pulverizing feedstock into a powder having a particle size less than about 0.40 mm;
compressing the powder into pellets;
generating subcritical or supercritical conditions for an environment of $CO_2$ or $N_2$;
placing the pellets in the subcritical or supercritical conditions;
heating the pellets at a constant heat rate until the environment of $CO_2$ or $N_2$ reaches a maximum temperature;
maintaining the environment of $CO_2$ or $N_2$ at the maximum temperature for a period of at least ten minutes; and
pyrolyzing the pellets to form carbon foam.

4. The method of claim 1, wherein a range of a ratio of a volume of the powder loaded into a containment device to a volume of a reactor is between about 1:10 to about 8.5:10.

5. The method of claim 3, wherein silicon particles are combined with the feedstock powder.

6. The method of claim 1, wherein a range of a ratio of a volume of the pellets to a volume of a reactor is between about 1:10 to about 8.5:10.

7. The method of claim 1, wherein the the bio-oil co-product is maintained at a temperature of between about −65° C. to about −85° C. after collection.

8. The method of claim 1, wherein the pellets are heated at a rate of at least 10° C./min.

9. The method of claim 3, further comprising:
collecting a bio-oil co-product.

10. The method of claim 1, wherein the $CO_2$ or $N_2$ environment further comprises $H_2O$.

11. The method of claim 3, wherein the pellets is heated at a rate of at least 10° C./min.

12. The method of claim 3, wherein the pulverized feedstock is one of corn stover, pine, *miscanthus giganteus*, hemicellulose, cellulose, lignin, bituminous coal, or combinations and mixtures thereof.

13. The method of claim 3, wherein the powder has a range of a ratio of a volume of the powder loaded into a containment device to a volume of a reactor is between about 1:10 to about 8.5:10.

14. The method of claim 3, further comprising:
reheating the pellets at a constant heat rate until the environment of $CO_2$ or $N_2$ reaches a maximum temperature;
exposing the environment of $CO_2$ or $N_2$ to the maximum temperature for a period of at least ten minutes; and
heat treating the carbon foam.

15. The method of claim 14, further comprising:
collecting a bio-oil co-product.

* * * * *